(12) United States Patent
Metz et al.

(10) Patent No.: US 10,969,340 B2
(45) Date of Patent: Apr. 6, 2021

(54) HEATING CHAMBER, HEATING FURNACE, ANALYSIS DEVICE, AND METHOD FOR ANALYZING FOREIGN MATTER CONTENTS IN SAMPLES

(71) Applicant: Schunk Kohlenstofftechnik GmbH, Heuchelheim (DE)

(72) Inventors: Joachim Metz, Dillenburg (DE); Ralf Gärtner, Lahnau (DE); Simon Hintner, Wetzlar (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 267 days.

(21) Appl. No.: 15/757,710

(22) PCT Filed: Aug. 31, 2016

(86) PCT No.: PCT/EP2016/070484
§ 371 (c)(1),
(2) Date: Mar. 6, 2018

(87) PCT Pub. No.: WO2017/042067
PCT Pub. Date: Mar. 16, 2017

(65) Prior Publication Data
US 2019/0041335 A1    Feb. 7, 2019

(30) Foreign Application Priority Data
Sep. 11, 2015    (DE) .................. 10 2015 115 355.6

(51) Int. Cl.
*F27D 11/00*    (2006.01)
*G01J 3/30*    (2006.01)
(Continued)

(52) U.S. Cl.
CPC ............. *G01N 21/74* (2013.01); *F27B 17/02* (2013.01); *F27D 5/0068* (2013.01); *F27D 11/04* (2013.01);
(Continued)

(58) Field of Classification Search
CPC .... F27B 17/02; F27D 11/04; F27D 2099/001; F27D 5/0068; F27D 99/0006; G01N 21/74; H05B 3/06; H05B 3/145; H05B 3/62
(Continued)

(56) References Cited

U.S. PATENT DOCUMENTS 4,547,069 A * 10/1985 Lersmacher ........... G01N 21/74
356/244
5,822,059 A * 10/1998 Tobe ...................... G01N 21/74
356/312

FOREIGN PATENT DOCUMENTS

DE    32 34 770 A1    3/1984
DE    92 10 876 U1    10/1992
(Continued)

OTHER PUBLICATIONS

Stefano Peis, International Search Report PCT/EP2016/070484 dated Nov. 18, 2016.
(Continued)

*Primary Examiner* — Sang Y Paik
(74) *Attorney, Agent, or Firm* — John J. Dresch; Dresch IP Law, PLLC

(57) ABSTRACT

A heating chamber (1) for a heating furnace is proposed, with which electrothermal vaporization of impurities from samples can be effected in order to be able to then analyze them spectrometrically. The heating chamber has a wall (3), a sample reception area (5), a nozzle area (7) and two electrical connection areas (9, 11). The heating chamber (1)
(Continued)

Figure 1:
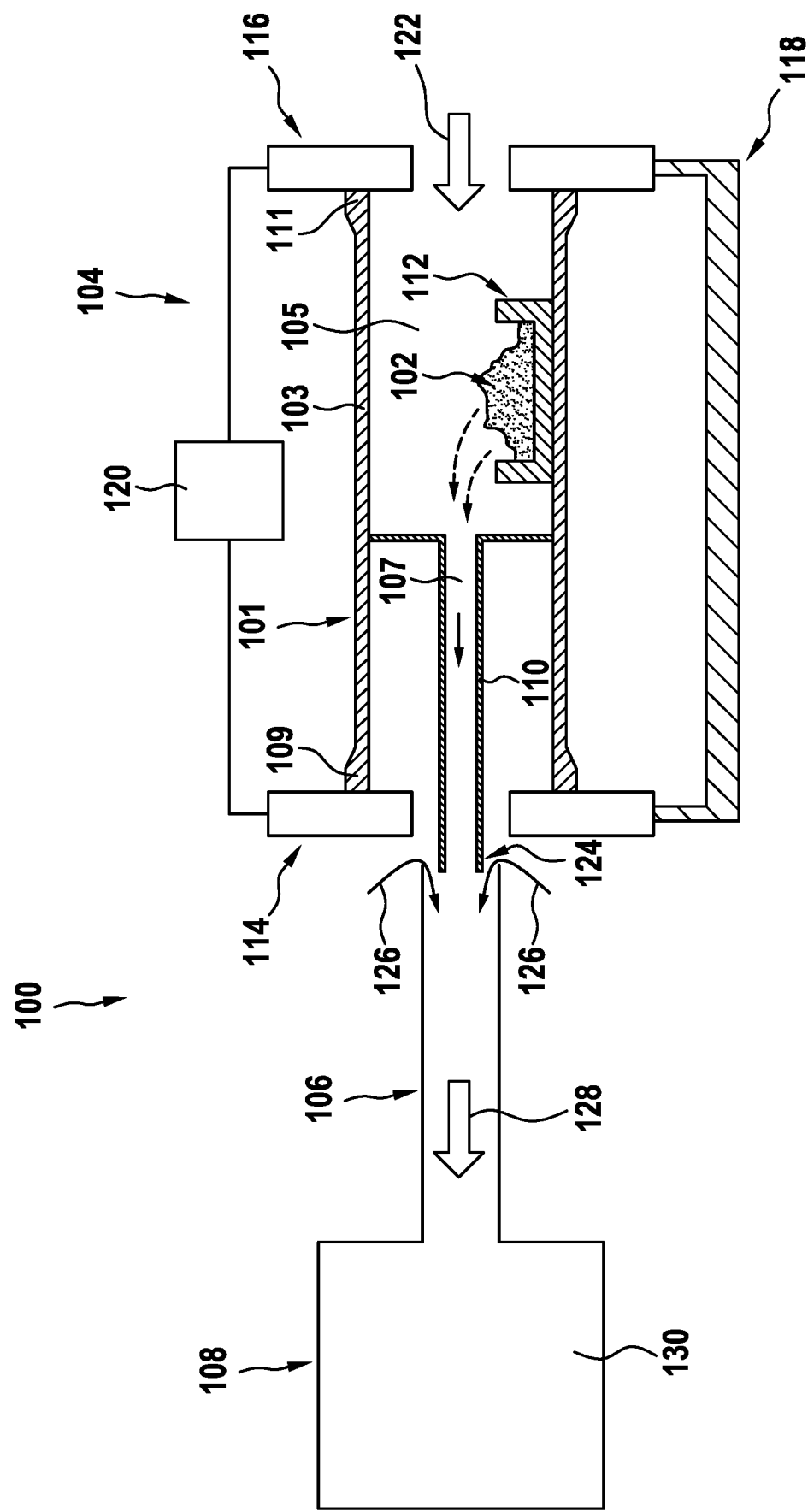
Figure 2:
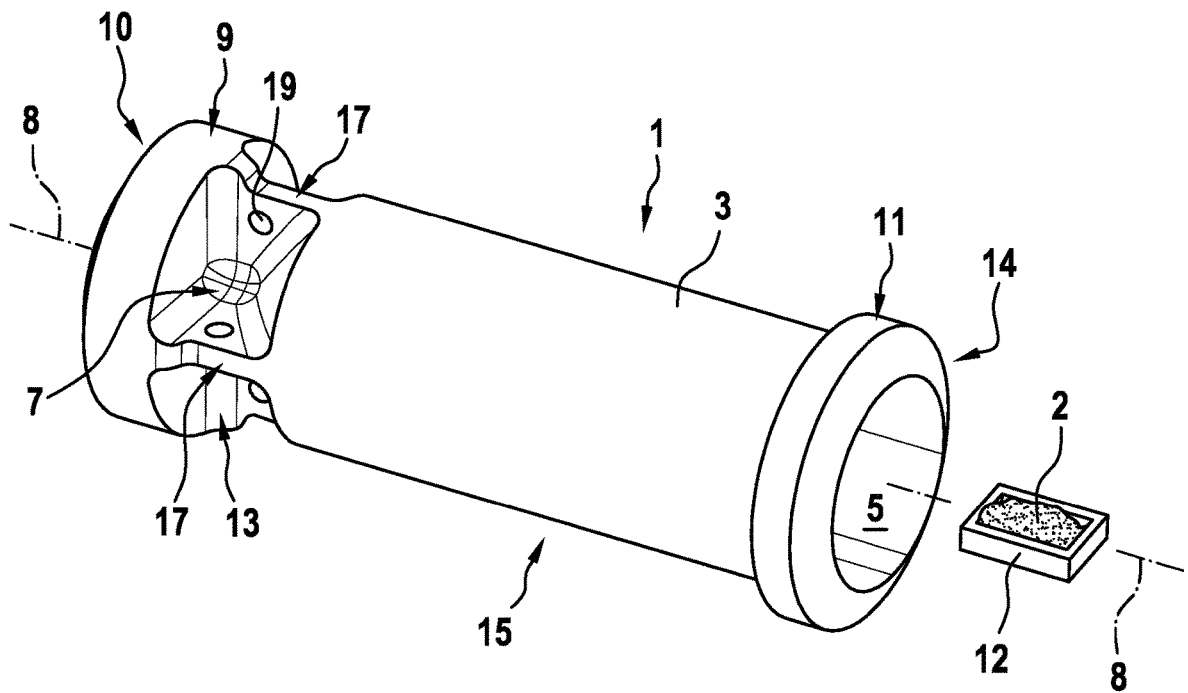
Figure 3:
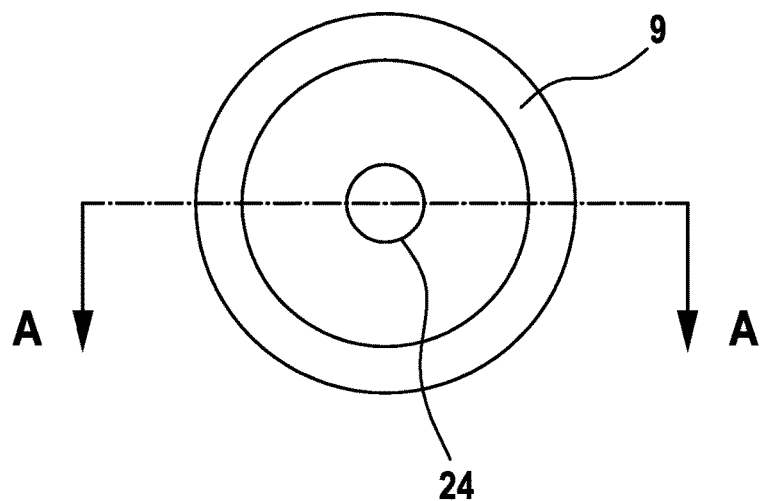
Figure 4:
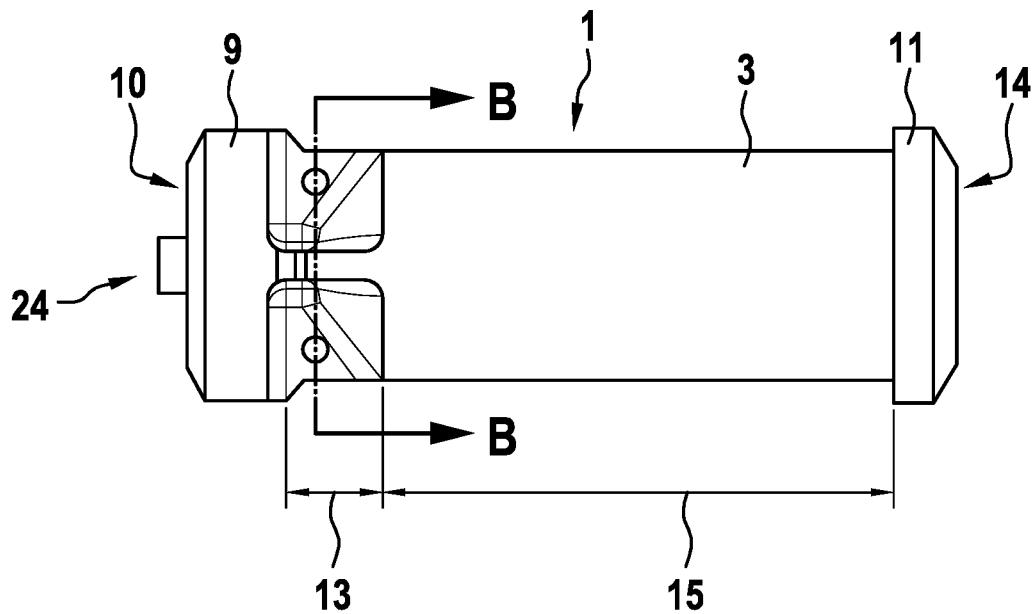
Figure 5:
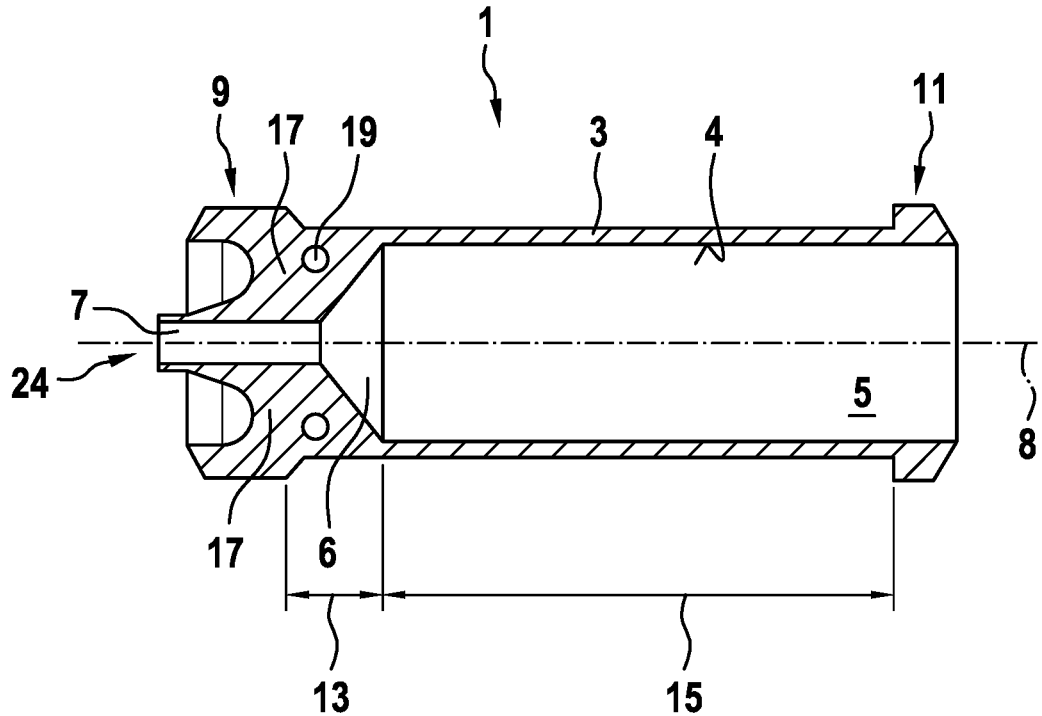
Figure 6:
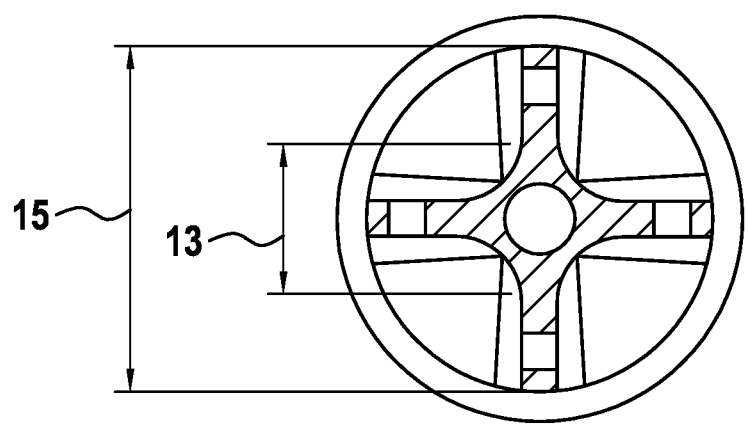

is specially configured such that an electric current flows through the wall (3) in such a way that a heating capacity caused by it is higher in the nozzle area (7) than in the sample reception area (5). For example, the electrical connection areas (9, 11) may be arranged in a radial direction remoter from the longitudinal axis (8) than a part of the wall (3) surrounding the nozzle area (7), and the heating chamber (1) may be configured, for example by means of a locally constricted area (13), in such a way that the current between the two electrical connection areas (9, 11) is predominantly conducted radially inwards towards the part of the wall (3) surrounding the nozzle area (7). Advantageous heat distribution in the heating chamber (1) achievable thereby may have a positive effect on the analysis of sample impurities.

15 Claims, 5 Drawing Sheets

(51) Int. Cl.
| | | |
|---|---|---|
| *G01N 21/74* | (2006.01) | |
| *F27B 17/02* | (2006.01) | |
| *F27D 11/04* | (2006.01) | |
| *H05B 3/06* | (2006.01) | |
| *H05B 3/14* | (2006.01) | |
| *H05B 3/62* | (2006.01) | |
| *F27D 99/00* | (2010.01) | |
| *F27D 5/00* | (2006.01) | |

(52) U.S. Cl.
CPC ........... *F27D 99/0006* (2013.01); *H05B 3/06* (2013.01); *H05B 3/145* (2013.01); *H05B 3/62* (2013.01); *F27D 2099/001* (2013.01)

(58) Field of Classification Search
USPC ....... 219/385, 391, 408, 409, 535–538, 541; 356/311, 312, 326; 373/109–137
See application file for complete search history.

(56) References Cited

FOREIGN PATENT DOCUMENTS

| | | | |
|---|---|---|---|
| DE | 198 37 831 A1 | 3/2000 | |
| DE | 199 32 874 A1 | 2/2001 | |

OTHER PUBLICATIONS

National Search Report DE 10 2015 115 355(B3) cited references by GPO in OA dated Jun. 7, 2016.
Cited by GPO in OA dated Jun. 7, 2016—Spectral Systems ETV-4000, http://web.archive.org/web/20100914172742/http://www.spectral-systems.de/prod01.htm.
Cited by GPO in OA dated Jun. 7, 2016—Hassler, Jürgen, et al. Determination of trace elements in high-purity copper by ETV-ICP OES using halocarbons as chemical modifiers. Journal of Analytical Atomic Spectrometry, 2011, 26. Jg., Nr. 12, S. 2404-2418. http://pubs.rsc.org/en/content/articlepdf/2011/ja/c1ja10149h.
Cited by GPO in OA dated Jun. 7, 2016—J.Haßler, P.R. Perzl, G. Zaray: Solid Sample Analysis of non-metallic elements (I,P,S) via Electrothermal Vaporisation by Optical Emission Spectroscopy with Inductively Coupled Plasma, Oct. 22, 2004 http://vvvvw.spectralsystems.de/ETV%202002%20KORR.pdf [rech. Jun. 6, 2016].
Cited by GPO in OA dated Jun. 7, 2016 - J.Haßler, O. Forster, P.R. Perzl: A Modern Electrothermal Vaporisation Instrumentation (ETV-IP-OES) and It's Application to Environmental and Biological Samples, Oct. 22, 2004 http://vvvvw.spectralsystems. de/Eger%202001%20ETV.pdf [rech. Jun. 6, 2016].
Cited by GPO in OA dated Jun. 7, 2016—ASFAW, Alemayehu; Wibetoe, Grethe; Beauchemin, Diane. Solid sampling electrothermal vaporization inductively coupled plasma optical emission spectrometry for discrimination of automotive paint samples in forensic analysis. Journal of Analytical Atomic Spectrometry, 2012, 27. Jg., Nr. 11, S. 1928-1934. DOI: 10.1039/C2JA30193H.
Cited by GPO in OA dated Jun. 7, 2016—Bertram, Rainer. Analyse von Kristallen mit ETV-ICP OES. tm-Technisches Messen, 2015, 82. Jg., Nr. 6, S. 339-344. ISSN (Online) 2196-7113, ISSN (Print) 0171-8096, DOI: 10.1515/teme-2014-0029, Jun. 2015.
Cited by GPO in OA dated Jun. 7, 2016—Sadiq, Nausheen; Beauchemin, Diane. Optimization of the operating conditions of solid sampling electrothermal vaporization coupled to inductively coupled plasma optical emission spectrometry for the sensitive direct analysis of powdered rice. Analytica chimica acta, 2014, 851. Jg., S. 23-29. http://ac.els-cdn.com/S0003267014011076/1-s2.0-S0003267014011076-main.pdf?_tid=ed1a8b1c-298f-11e6-8cca-00000aacb35f&acdnat=1464961061_99f1f1d548c1cf2eca97a260aee90ddd.
Cited by GPO in OA dated Jun. 7, 2016—Schulz Olaf, Waarlo Hans-Jorg, Venes Nina, Wustkamp Dirk: ETV-ICP-OES—New perspectives for material analysis, Spectro Analytical Instruments, CETAS May 19-21, 2015 http://vwvw.stahl - online.de/Cetas2015/Downloads/A70.pdf.
Cited by GPO in OA dated Jun. 7, 2016—S. Richter, P. Barth , J. Hassler , R. Matschat , U. Panne: Determination of Trace Elements in High Purity Graphite by ETV-ICP-MS/OES Using Different Gaseous Modifiers, Feb. 10, 2008 https://old.bam.de/server/dl.php?url=http://old.bam.de/en/kompetenzen/fachabteilungen/ abteilung_1/fg11/fg11_medien/siri_esas_etvicpms_250908.pdf [rech. Mar. 6, 2016].
Cited by GPO in OA dated Jun. 7, 2016—Hassler, J., et al. Determination of 22 trace elements in high-purity copper including Se and Te by ETV-ICP OES using SF 6, NF 3, CF 4 and H 2 as chemical modifiers. Journal of Analytical Atomic Spectrometry, 2016. http://pubs.rsc.org/en/content/articlepdf/2016/JA/C5JA00240K.

\* cited by examiner

HEATING CHAMBER, HEATING FURNACE, ANALYSIS DEVICE, AND METHOD FOR ANALYZING FOREIGN MATTER CONTENTS IN SAMPLES

FIELD OF THE INVENTION

The present invention relates to a heating chamber for a heating furnace, as it can be used in an analysis device for analyzing foreign matter contents in samples.

BACKGROUND OF THE INVENTION

For the analysis of foreign matter contents in samples, a so-called solid matter sample injection in the form of electrothermal vaporization (ETV) has been found to be a modern and highly promising variant for the preparation of analysis samples for spectrometric analysis as well as for the introduction of these samples into corresponding analytical apparatuses, as it often enables very low detection limits to be achieved.

For example, an analysis of carbon materials by means of electrothermal vaporization, coupled with an optical emission spectrometer using a plasma as an excitation source (shortly often referred to as ETV-ICP/OES), can be used as a proven method to determine a content of foreign atoms in, for example, high-purity graphites with a degree of impurities below 1 ppm. In this process, the sample is heated to up to 3000° C. in a heating furnace using, for example, argon as a carrier gas, and impurities, usually in the form of highly refractory compounds, are converted into a gas phase by means of reaction gases which react with the present impurities to form volatile substances. The carrier gas with the vapors containing foreign atom halide, for example, is then converted into an aerosol in a sheathing gas stream process. By means of such a direct solid matter injection, impurities may be conveyed directly into a downstream plasma of a spectrometer. A resulting transient spectrometer signal may then be recorded and evaluated.

This special combination of sample injection and analysis technology may achieve very low detection limits in the lower to medium ppt range (i. e. "parts per trillion", corresponding to [ng/kg]). Due to an analysis time of only a few minutes per sample and in combination with an autosampler, for example, this method may at the same time offer a high degree of economy in the laboratory.

The samples to be measured with the method mentioned may originate from a refining process of high-temperature gas purification. This last step may be based on the same principles as the solid matter sample injection by means of ETV. In order to be able to make a clear statement about a success of this process step of high-temperature cleaning, it may be essential to know both the level of impurities in the reactants (in this case the unpurified graphite) and that of the products (in this case the purified graphite). Since the content of foreign atoms in the starting material may lie in the middle to upper ppm range, an ETV-based analysis of these samples results in an increased risk of element carry-over into the subsequent analysis run (so-called memory effect).

Due to the low level of total impurities in the product (the total content of all foreign atoms in purified graphites is typically approx. 1 ppm), a low detection limit of the individual elements is desirable in this case.

Therefore, it is desirable to increase a sensitivity of analysis devices and methods used for analyzing foreign matter contents in samples.

It was discovered that, among other things, hardware components of an analysis device used for the analysis method mentioned above may have a decisive influence on an optimization of the sensitivity of the analysis method.

SUMMARY OF THE INVENTION AND OF ADVANTAGEOUS EMBODIMENTS

It has thus been recognized that there may be a need for a heating chamber for a heating furnace, which has been improved with respect to its properties when electrothermal vaporization is carried out in comparison with conventional heating chambers and may thus contribute to an increase in sensitivity and/or to minimizing the memory effect of the analysis procedure mentioned at the beginning. Furthermore, there may be a need for a heating chamber which is as durable as possible so as to thus among other things keep costs low when carrying out the analysis procedure mentioned at the outset. Furthermore, there may be a need for a heating furnace, an analysis device and a method of analyzing foreign matter contents in samples for which the heating chamber of the invention is used.

Such a need may be met with the subject matter of one of the independent claims. Advantageous embodiments are described in the dependent claims as well as in the following description.

According to an aspect of the invention, a heating chamber for a heating furnace is proposed which has an electrically conductive wall, a sample reception area, a nozzle area, a first electrical connection area and a second electrical connection area. The sample reception area and the nozzle area are each surrounded by the wall. The sample reception area and the nozzle area are arranged one after the other along a central longitudinal axis and configured in fluid communication with each other. The sample reception area has a larger cross-sectional area than the nozzle area. The first and second electrical connection areas are arranged adjacent to opposite ends of the heating chamber with regard to the longitudinal axis of the heating chamber and electrically connected to the wall. The heating chamber is configured such that an electric current produced by applying an electric voltage to the first and second electrical connection areas flows through the wall in such a way that a heating capacity caused by it is equal or higher in the nozzle area compared to the sample reception area.

Without limiting the scope of the invention in any way whatsoever, ideas and possible features regarding embodiments of the invention may be considered, inter alia, as being based on the thoughts and findings described below.

As will be explained in detail below in connection with the description of preferred embodiments, it has been observed that when using the heating furnace for electrothermal vaporization and a subsequent analysis of the foreign matter contents in a sample evaporated in the process, properties of the heating chamber used in a heating furnace may influence the accuracy or sensitivity with which foreign matter contents can be determined and analyzed. It has also been observed that conventional heating chambers may have a limited service life.

The temperature distribution within the heating chamber has now been recognized as an essential property of the heating chamber used, which may influence the analysis sensitivity and/or the service life of the heating chamber.

In short, it has been observed, among other things, that in conventionally used heating chambers, a sample introduced into a sample reception area is heated faster and to higher temperatures than the nozzle area of the heating chamber, and that this may have a negative effect on a subsequent analysis of the foreign matter contents thermally released from the sample and/or may shorten the service life of the heating chamber.

In this context, it has been found that it may be advantageous to design the heating chamber in such a way that an electric current used to heat the heating chamber, which flows through the different areas of the heating chamber and there causes a conversion of electrical power into heating power due to electrical resistances, preferredly flows through the different areas of the heating chamber in such a way that it produces an equal or higher heating capacity in the nozzle area than in the sample reception area. This may help to achieve that the nozzle area preferably heats up faster and/or to higher temperatures than the sample reception area.

In order to achieve such a heating capacity, which is specifically induced locally within the heating chamber, the first and second electrical connection areas may, according to an embodiment, in a radial direction be arranged remoter from the central longitudinal axis passing through the heating chamber than a part of the wall of the heating chamber surrounding the nozzle area. The heating chamber should preferably be configured in such a way that the electric current induced between the first and the second electrical connection area is mainly, i. e. preferably to more than 50%, more preferably to more than 75%, directed radially inwards towards the part of the wall surrounding the nozzle area.

In other words, according to this embodiment, a part of the wall of the heating chamber surrounding the nozzle area, which has a narrower cross-section, may extend closer to the central longitudinal axis through the heating chamber than that part of the wall in the first and second electrical connection areas. In other words yet, the first and second electrical connection areas are further radially spaced from the central longitudinal axis than the part of the wall surrounding the nozzle area.

Due to its geometric design, for example, the heating chamber is now configured so that an electric current produced between the two electrical connection areas flows at least predominantly through the part of the wall surrounding the nozzle area which is closer to the longitudinal axis, i. e., coming from one of the electrical connection areas, is diverted radially inwards towards the central longitudinal axis, and, at best, a smaller proportion of the total current caused between the two electrical connection areas compared thereto flows along current paths which have the same distance to or are even further radially spaced apart from the central longitudinal axis than the two electrical connection areas.

All in all, a current flow determined by the geometry of the heating chamber, which effects the heating capacity, may thus be guided closer to the central longitudinal axis in the radial direction in the nozzle area than in the rest of the heating chamber area, especially than in the sample reception area.

Since a major proportion of the current used for heating is diverted radially inwards to the part of the wall surrounding the nozzle area, two effects can usually be achieved. For one thing, the heating capacity caused by the electric current flowing through is generated very close to the nozzle area, so that a surface of the wall surrounding the nozzle area is heated quickly and efficiently. For another thing, a preferably smaller cross-sectional area within the wall is available for the passage of the current flowing through, so that a higher current density, and consequently a higher conversion of electrical power losses into thermal power, is reached locally adjacent to the nozzle area than, for example, in parts of the wall which are spaced further apart from the longitudinal axis in the radial direction and which surround the sample reception area.

According to an embodiment, the wall of the heating chamber has a narrowed cross-section geometry in a constricted section in which the wall surrounds the nozzle area compared to areas in which the wall surrounds the sample reception area.

In other words, according to this embodiment, the wall of the heating chamber is to have a narrowed cross-section geometry, i. e. a reduced cross-sectional area measured in a plane across the longitudinal axis of the heating chamber, where it surrounds the nozzle area, compared to areas where the wall surrounds the sample reception area. In the constricted section, therefore, a radially outward facing surface of the wall is on average less remote from the central longitudinal axis than in the non-constricted sections in which the wall surrounds the sample reception area.

For one thing, such a locally narrowed cross-section geometry of the wall adjacent to the nozzle area has the effect that an electric current flowing between the electrical connection areas must flow close to the narrow nozzle area disposed radially inside and generate its heating power there. For another thing, the local constriction of the wall, in a manner similar to a local necking, may cause the current flowing between the electrical connection areas to be forced to flow through a smaller cross-section, resulting in a higher current density, which in turn leads to an increased heating capacity. Overall, in this way, the nozzle area is heated more than the sample reception area.

According to an embodiment, the heating chamber has web areas in the constricted section, which bridge the constricted section so as to form a mechanically loadable, preferably linear, connection between the opposite ends of the heating chamber.

In other words, although the constricted section, radially adjacent to the nozzle area, may have an overall narrowed cross-section geometry, it may, despite the reduced cross-sectional area, also have web areas which may serve as a mechanical support between non-constricted sections in the direction of the longitudinal axis in front of and behind the constricted section. The web sections may thus bridge a local necking of the wall in the constricted section at least at some locations, so that, e. g., mechanical forces acting on the wall, in particular mechanical forces acting largely in parallel to the longitudinal axis, may be dissipated in the constricted section via the web areas and may thus be transmitted over to the opposite ends of the heating chamber. The web areas extend and thus bridge the constricted section essentially in directions parallel to the longitudinal axis of the heating chamber, so that a mechanically loadable linear connection across the web areas is created between the opposite ends of the heating chamber.

According to an embodiment, the heating chamber has several web areas distributed equidistantly along a circumference of the constricted section. For example, at least two web areas opposite to each other in relation to the longitudinal axis, but preferably at least three or four or more web areas, which are evenly distributed over the circumference of the constricted section, may be provided. In this way, mechanical forces acting particularly between the opposite ends of the heating chamber can be dissipated in a manner evenly distributed over the circumference of the wall of the heating chamber and its integrated web areas.

According to an embodiment, the first and second electrical connection areas are formed by end faces of the wall at opposite ends of the heating chamber. Therein, the first and second electrical connection areas have essentially the same cross-section geometry.

In other words, the two electrical connection areas at the heating chamber may be configured in an essentially same or similar manner and may be formed at the opposite ends of the heating chamber by end faces of the wall running across the longitudinal axis. A heating chamber configured in this way may be interposed in a simple way between two two-dimensional electrical contacts arranged in parallel to each other, for example in the form of planar electrodes, so that a voltage may be applied to the electrically conductive wall from the electrical contacts over the entire end faces of the wall serving as connection areas, and thus an electric current flow may be produced over a large area through the entire wall.

According to an embodiment, the sample reception area and/or the nozzle area are formed axially symmetrical, preferably rotationally symmetrical, in relation to the central longitudinal axis.

In other words, an inner surface of the wall surrounding the sample reception area and the nozzle area is designed to be axially symmetrical or preferably rotationally symmetrical with respect to the longitudinal axis running centrally therethrough. Points on this surface opposite each other with respect to the longitudinal axis are thus each equally distant from the longitudinal axis in the radial direction (axial symmetry), wherein this preferably applies to all points along a circumference around the longitudinal axis (rotational symmetry). This preferably applies to both the sample reception area and the nozzle area. For example, an axially symmetrical, preferably rotationally symmetrical, design of these two areas may result in an advantageous flow distribution of gas conducted through these areas, which may be particularly advantageous in the employment as a heating furnace for an analysis device.

According to an embodiment, the wall is configured axially symmetrical, preferably rotationally symmetrical with respect to the longitudinal axis adjacent to the sample reception area and/or the nozzle area.

In other words, in contrast to the embodiment previously described, not only the sample receiving and nozzle areas, i. e. an inner surface of the wall facing these areas, may be formed axially symmetrical or rotationally symmetrical, but the entire wall may be designed in such a symmetrical manner. Such a symmetrical constructed wall may result in advantageous physical properties such as a high mechanical stability distributed evenly over the periphery of the wall and/or a homogeneous distribution of an electric current conducted through the wall, and thus a homogeneous heat generation. The axis symmetry or rotation symmetry may apply to the wall both in partial areas adjacent to the nozzle area and also, complementary or alternatively, in partial areas adjacent to the sample reception area, wherein, for example, web areas in a constricted section adjacent to the nozzle area may form permissible exceptions to an otherwise axially symmetrical or especially rotationally symmetrical formation of the wall. What may be of advantage especially in the case of a rotationally symmetrical configuration of the wall surrounding individual areas of the heating chamber, is the fact that such rotationally symmetrical structures may be manufactured easily, for example by turning or milling.

According to an embodiment, the nozzle area with a nozzle outlet located radially far inside, in the axial direction, protrudes beyond end faces of the wall located radially further outside.

In other words, a nozzle outlet may be provided at the heating chamber, which, seen in the radial direction, extends close to the central longitudinal axis and which, seen in the axial direction, projects in a direction away from the sample reception area over end faces of the wall located radially further outside. Such a protruding nozzle outlet may for example project into a pipe or connecting tube arranged adjacent to the heating chamber so that, for example, gas escaping through the nozzle outlet may be efficiently introduced into such a pipe or tube.

According to an embodiment, at least the wall of the heating chamber consists of graphite. Preferably, the entire heating chamber may consist of graphite. Graphite, on the one hand, has a high electrical conductivity and, on the other hand, can withstand very high temperatures, so that it is very well suited for the wall of the heating chamber to be electrically heated. In principle, it is conceivable to configure the heating chamber with the addition of other, preferably very thermally stable, materials which do not necessarily have to have a high electrical conductivity. However, it seems advantageous to form the entire heating chamber of graphite.

In particular, it may be advantageous to form the entire heating chamber in one piece. For example, the heating chamber may be manufactured from a graphite block by cutting, milling, turning or other processing techniques.

According to a second aspect of the present invention, a heating furnace is described which has a mechanical mount, a first and a second electrical contact and a heating chamber according to an embodiment of the aforementioned first aspect of the invention. The heating chamber is held in the mount, and the first electrical connection area of the heating chamber is contacted with the first electrical contact, and the second electrical connection area of the heating chamber is contacted with the second electrical contact.

While the mechanical mount is able to hold the heating chamber in a desired position, the two electrical contacts may ensure that, for example, a voltage can be applied to the two electrical connection areas of the heating chamber held in place from an external voltage source. The mechanical mount and/or the two electrical contacts should be configured in such a way that they are able to withstand the high temperatures occurring at the heating chamber during operation, for example due to the materials used or a geometric design.

Preferably, the mechanical mount and the two electrical contacts may be designed as a common device which is suitably designed both for mechanically holding the heating chamber and for introducing an electric current into the wall of the heating chamber. The electrical contacts may be designed to withstand the high electric currents of often several 100 A required to efficiently heat the wall of the heating chamber.

According to a third aspect of the invention, an analysis device for analyzing foreign matter contents in samples is proposed. The analysis device comprises a heating furnace according to an embodiment of the aforementioned second aspect of the invention as well as a connection tube and a spectrometer, for example an optical spectrometer, in particular an optical emission spectrometer. The nozzle area of the heating chamber of the heating furnace opens into the connection tube in such a way and the connecting tube again opens into the spectrometer in such a way that gas formed in the sample reception area of the heating chamber may be conveyed into the spectrometer via the nozzle area and the connecting tube.

The basic structure of the proposed analysis device is essentially the same as that of an ETV ICP/OES described in the introduction. Due to the special design of the heating chamber of the heating furnace used for this purpose, in particular due to the favorable heat distribution in the nozzle area and the sample reception area generated therein during operation, gas flowing in the sample reception area, into which, at the high temperatures generated, foreign substances from a sample accommodated therein may migrate, may be efficiently conducted through the nozzle area without any danger of foreign matter particles or foreign matter vapors contained therein precipitating or condensing on the wall limiting the nozzle area, or of them to a greater extent forming any chemical compounds therewith. Instead, this foreign matter can be efficiently introduced into the connecting tube outside the heating furnace and, for example, with another, cooler carrier gas under the formation of an aerosol, be introduced into an analysis chamber of the spectrometer, where it can then be analyzed spectroscopically.

According to a fourth aspect of the invention, a method for analyzing foreign matter contents in samples is proposed, wherein the samples are heated up in a sample reception area of a heating chamber according to an embodiment of the above mentioned first aspect of the invention in order to release foreign matter contents contained therein.

The use of the heating furnace described herein with the heating chamber which is advantageously designed with regard to its heat distribution, may lead to the fact that foreign matter escaping from the samples may be analyzed very efficiently, e. g. by spectroscopy, and the method may thus obtain a very high sensitivity and accuracy, e. g. up to a desired ppt range (i. e. [ng/kg]).

It is pointed out that possible features and advantages of embodiments of the invention are described herein partly with reference to a heating chamber designed according to the invention, partly with reference to a heating furnace designed according to the invention, partly with reference to an analysis device designed according to the invention and partly with reference to an analysis method carried out according to the invention. A person skilled in the art will recognize that the features described for individual embodiments are suitable to be transferred in an analogous manner to other embodiments, to be adapted and/or exchanged in order to arrive at further embodiments of the invention and possibly synergy effects.

BRIEF DESCRIPTION OF THE DRAWINGS

In the following, advantageous embodiments of the invention are further explained with reference to the attached drawings, wherein neither the drawings nor the explanations are to be interpreted as restricting the invention in any way.

FIG. 1 shows a cross-section of an analysis device with a conventional heating chamber.

FIG. 2 shows a perspective view of a heating chamber according to an embodiment of the present invention.

FIG. 3 shows a front view of the heating chamber of FIG. 2.

FIG. 4 shows a side view of the heating chamber of FIG. 2.

FIG. 5 shows a sectional view along the line A-A of FIG. 3 of the heating chamber of FIG. 2.

FIG. 6 shows a sectional view along the line B-B of FIG. 4 of the heating chamber of FIG. 2.

FIGS. 7 to 9 show side views of heating chambers according to alternative embodiments of the present invention.

The figures are only schematic and not to scale. In the different drawings, identical reference signs designate identical feature or features having identical effects.

DESCRIPTION OF ADVANTAGEOUS EMBODIMENTS

FIG. 1 shows an analysis device 100 which can be used to analyze foreign matter contents in a sample 102. The analysis device 100 comprises a heating furnace 104, a connecting tube 106 and a spectrometer 108.

In the example shown in FIG. 1, a conventional heating chamber 101 is accommodated in the heating furnace 104. The heating chamber 101 has a hollow-cylinder-shaped wall 103. In a front half, the wall 103 surrounds a sample reception area 105. In the sample reception area 105, a sample carrier 112 containing the sample 102 can be received. In a rear half, the wall 103 surrounds a nozzle 110 with a nozzle area 107 accommodated therein. Furthermore, the heating chamber 101 also has electrical connection areas 109, 111 each at its rear end and at its front end. The two electrical connection areas 109, 111 are formed by end faces of the tubular wall 103, which is thickened at its ends.

The heating chamber 101 is accommodated and held in the heating furnace 104 in such a way that the wall 103 is clamped between two electrical contacts 114, 116, each of which has a circular ring shape, and by them is held mechanically as well as is electrically connected at the electrical connection areas 109, 111. The electrical contacts 114, 116 are in turn held by a mechanical mount 118 which thus indirectly also holds the heating chamber 101. Furthermore, the electrical contacts 114, 116 are connected to a current source 120 which can be used to produce an electric current through the electrically conductive wall 103 of the heating chamber 101.

In order to analyze foreign matter contents in a sample 102, such as a graphite sample, the sample 102 is introduced into the sample reception area 105 of the heating chamber 101 on the carrier 112. The heating chamber 101 is then heated by conducting an electric current through its electrically conductive wall 103, where it generates heat due to electrical resistance losses, which, among other things, heats up the sample reception area 105 and the sample 102 accommodated therein to temperatures of up to 3000° C. or even 3200° C.

At such high temperatures, impurities are released from the sample 102. At the same time, a carrier gas 122, e. g. argon, is passed through the sample reception area 105 together with reaction gases, which can react with the impurities to form volatile substances. The hot carrier gas 122 together with the impurity vapors absorbed therein, e. g. foreign atomic halide vapors, then flows through the nozzle area 107 of the nozzle 110. An outlet 124 of this nozzle 110 protrudes in the longitudinal direction of the heating chamber 101 beyond the end faces radially located further outside at the front electrical connection area 109 of the heating chamber 101 and also beyond the annular electrical contact 114 of the heating furnace 104 and opens into the connection tube 106. Together with the hot gas from the heating chamber 101, a cooler sheathing gas 126 is introduced into the connecting tube 106 so that an aerosol 128 forms there which may then be introduced into an analysis chamber 130 of the spectrometer 108. There, the constituents of this aerosol, including the impurities contained therein originating from the sample 102, may be analyzed.

When using an analysis device 100 with a conventional heating chamber 101 as exemplarily shown in FIG. 1, some deficits or problems have been observed.

For example, it has been observed that in the case of special elements, in particular some elements from the group of carbide formers such as boron, silicon, vanadium, etc., a recovery rate during an analysis procedure carried out with the analysis device 100 may be significantly lower than with other elements. This may lead to a non-linear and only limitedly reproducible calibration behavior of these elements, in particular boron and silicon, and consequently to major fluctuations in the analysis results.

Furthermore, a significant tendency to carry over analytes from one analysis run to another has been observed, especially with regard to the above-mentioned elements of the group of carbide formers.

The effects mentioned above may lead to an analytical precision of a sample analysis based on electrothermal vaporization being significantly lower in the statistical sense compared to other analysis methods, i. e. the values for relative standard deviations (RSD) may be considerably higher than the values known, for example, from liquid sample injection methods.

Furthermore, it has been observed that the endurance or service life of conventional heating chambers is sometimes significantly limited. For example, a failure of the heating chamber and in particular of its tubular wall was often observed in the same places, i. e. approximately in the second front quarter of the wall, circa in the area of a position of the sample carrier 112. A significant reduction of a wall cross-section in this area with the consequence of a mechanically caused component fracture was predominantly recognized as the reason for the failure.

There has therefore been a need to solve the aforementioned deficits and problems. To this end, the causes of, for example, the reduced analysis sensitivity in particular to elements from the group of carbide formers, for the carry-over of analytes into subsequent analysis runs and for a lack of analytical precision when using the ETV method had to be investigated.

Microscopic examinations of the nozzle 110, especially in the rear area of the heating chamber 101, revealed deposits dependent on a type and concentration of analytes used. These deposits consisted mainly of the above-mentioned elements of the group of carbide formers, for which a significantly reduced recovery rate and a risk of carryover to subsequent analysis runs were observed.

A subsequent measurement of a temperature profile of the heating chamber 101 showed significant temperature inhomogeneities along the longitudinal extension of the component. In particular, where mechanical failure of the wall 103 of the heating chamber 101 was frequently observed, some considerable temperature increases were found, which could be regarded as the reason for the assumed material removal and thus for a reduction of the wall thickness of the heating chamber 101 in this section.

In addition, it was observed that in the rear area of the heating chamber 101 and especially at the outlet 124 of the nozzle 110, often much lower temperatures prevailed compared to the rest of the heating chamber 101. It is assumed that these cooler places lead to analyte condensation or to chemical reactions, which under these temperature conditions are reversible only to a limited extent, with the material of the nozzle wall, i. e. in particular to carbide formation between the analytes and the carbon of the nozzle 110, which usually consists of graphite. This can also be seen as a cause for the observed low recovery rates, material carryovers and increased values of the relative standard deviations.

As a result of such investigations, it could be deduced that it is highly likely that a temperature profile prevailing in the heating chamber 101 would be largely responsible for the observed deficits and problems in carrying out analyses of foreign matter content using conventional analysis devices.

In order to eliminate these problems and deficits, it is therefore proposed to make the temperature distribution within the heating chamber used for electrothermal vaporization more homogeneous or even shift a temperature maximum to an area of an outlet from the heating chamber, i. e. to the nozzle area, preferably without negatively influencing other important properties of the heating chamber, such as its mechanical stability.

For this purpose, it is proposed to modify the heating chamber in such a manner that an electric current produced by applying a voltage to the first and second electrical connection areas flows through the wall in such a way that a heating capacity generated by it is higher in the nozzle area than in the sample reception area.

While in the conventional heating chamber 101, which is illustrated in FIG. 1 as an example, the nozzle 110 is heated only indirectly, i. e. for example by heat radiation of the surrounding, actively heated wall 103, the nozzle area of the further developed heating chamber proposed herein is to be heated specifically actively and directly by directing an electric current produced in the heating chamber precisely in such a way that an increased heating capacity is achieved in this nozzle area.

In contrast to the conventional heating chamber 101, in which the nozzle 110 was only indirectly heated and thus generally became hot later than, for example, the sample reception area 105 and also only experienced lower maximum temperatures, this increased heating capacity specifically achieved in the nozzle area may lead to the fact that in the modified heating chamber proposed herein, the nozzle area is preferably heated faster than the sample reception area and is preferably also heated up to higher temperatures compared to this sample reception area.

This helps to prevent, among other things, that at the beginning of an analysis process, the sample reception area 105 and the sample 102 taken up in it are first heated to high temperatures and impurities start to be released from the sample 102 before the nozzle 110 has been heated to sufficiently high temperatures, so that analytes may in part deposit on the still too cold wall of the nozzle 110.

Instead, at the beginning of the analysis process, first the nozzle area is brought to sufficiently high temperatures before the sample 102 taken up in the sample reception area 105 reaches sufficient temperatures to release impurities to a significant degree. This may significantly reduce the risk of deposits of impurity vapors on the wall of the nozzle.

Among other things, this may lead to the fact that, for example, the above-mentioned elements from the group of carbide formers, coming from the heating chamber, to a greater extent reach the spectrometer 108, where they can be analyzed quantitatively with high sensitivity.

With reference to the heating chamber 1 according to an embodiment of the present invention, which is represented in different ways in FIGS. 2 to 6, possible features and modifications of the heating chamber 1 presented here are to be explained in more detail below in comparison with conventional heating chambers 101.

Essentially, the heating chamber 1, like the conventional heating chamber 101, has a cylindrical shape and is therefore sometimes referred to as a furnace pipe. In the example shown, the entire heating chamber 1 is integrally made of graphite. The heating chamber 1 has an electrically conductive wall 3 which surrounds a sample reception area 5 in a front part of the heating chamber 1 and which surrounds a nozzle area 7 in a rear part of the heating chamber 1. The sample reception area 5 and the nozzle area 7 are therefore preferably cylindrical cavities, which are accommodated within the wall 3 of the heating chamber 1 and are bounded by it in the radial direction, merge into each other and are open towards the outside at their end faces in the form of an inlet or an outlet. The sample reception area 5, via a conical, funnel-shaped intermediate area 6, opens into the nozzle area 7 and is thus connected therewith in fluid communication, so that gases arising or flowing in the sample reception area 5 can flow into the nozzle area 7. The sample reception area 5 and the nozzle area 7 are thus arranged one after the other along a central longitudinal axis 8. The nozzle area 7 has a substantially smaller cross-sectional area than the sample reception area 5.

In the example shown, both the sample reception area 5 and the nozzle area 7 are designed rotationally symmetrical with respect to the longitudinal axis 8, i. e. they have an essentially cylindrical geometry, in which a cylindrically shaped barrel inner surface 4 of the wall 3 laterally surrounds the volumes of the sample reception area 5 and the nozzle area 7, respectively. The funnel-shaped intermediate area 6 is also configured to be rotationally symmetrical. The sample reception area 5 is open towards a front end face 14 so that a sample 2 together with a sample carrier 12 holding it may be introduced into the sample reception area 5. The nozzle area 7 is at one end face 10 open to the rear, so that gas can escape from it.

In addition, the nozzle area 7 projects backwards beyond areas of the rear end face 10 of the heating chamber 1 which are located further outside in the axial direction, so that a nozzle outlet 24 may for example extend into a connecting tube 106 which is disposed adjacent to it in the longitudinal extension. Gas escaping from the nozzle outlet 24 may thus be entrained by a stream of sheathing gas flowing in the connecting tube 106.

At opposite ends of the heating chamber 1, a first and a second electrical connection area 9, 11, respectively, are provided. These electrical connection areas are formed by local thickenings near areas of the end faces of the wall 3 which are located radially outside. The electrical connection areas 9, 11 are thus electrically connected to the remaining areas of the wall 3, so that when a voltage is applied to these two electrical connection areas 9, 11, an electric current is produced within the wall 3. Due to electrical resistances in the wall 3 and resulting electric conduction losses, the wall 3 heats up considerably.

In order to achieve a preferably higher heating capacity in the nozzle area 7 than in the sample reception area 5, the heating chamber 1 is preferably designed in such a way that the first and second electrical connection areas 9, 11 are arranged further apart from the longitudinal axis 8 in the radial direction than a part of the wall 3 surrounding the nozzle area 7. The heating chamber 1 is preferably designed in such a way that the current between the first and second electrical connection areas 9, 11 produced in the wall 3 is preferably directed predominantly radially inwards towards the part of the wall 3 surrounding the nozzle area 7, where it develops an increased heating capacity concentrated on the nozzle area 7.

In addition, a cross-sectional area of the wall 3 may optionally be smaller in sections surrounding the nozzle area 7 than in other sections, in particular than in the sections surrounding the sample reception area 5, so that a higher electric current density and thus a higher heating capacity may be achieved locally adjacent to the nozzle area.

In order to be able to achieve such a specific diversion of the electrical current used for heating towards the nozzle area 7 located radially further inside, a constricted section 13 is provided at the heating chamber 1, in which the wall 3 surrounds the nozzle area 7 and which has a narrowed cross-section geometry compared to areas 15 in which the wall 3 surrounds the sample reception area 5. In other words, the otherwise tubular, cylindrical structure of the heating chamber 1 exhibits a local "necking" in the rear area adjacent to the nozzle area 7, i. e. is reduced to a smaller cross-section. Therefore, an electric current fed at the front electrical connection area 9 must, in this constricted section 13, first of all flow towards the radially inner nozzle area 7 and there flow through a small cross-section so that a high electric current density is reached locally and thus a high heating capacity is achieved. Only after that can the electric current again move radially further outwards and there flow through the wall 3 in the section 15, whereby a current density is lower and thus a heating capacity is reduced in this area 15 adjacent to the sample reception area 5.

In order to provide sufficient mechanical stability for the heating chamber 1 in spite of the local constriction in the constricted section 13 proposed here, several web areas 17 are provided in the constricted section 13. These web areas 17 run parallel to the longitudinal axis 8 and bridge the constricted section 13 locally to form a mechanically loadable linear connection between the opposite ends of the heating chamber 1.

If the heating chamber 1 is mechanically clamped between the electrical contacts 114, 116, as exemplarily shown in FIG. 1, and is therefore mechanically loaded in a direction parallel to the longitudinal axis 8, these web areas 17 are able to transmit the mechanical forces acting between the electrical connection areas 9, 11 in the process so that these forces do not endanger a mechanical integrity of the heating chamber 1, especially in the constricted section 13.

In the embodiment described in FIGS. 2 to 6, four web areas 17 are shown which are distributed equidistantly along the circumference of the constricted section 13. In addition, recesses 19 are provided in the web areas 17, which are designed in such a way that on the one hand an electrical current is to the greatest possible extent conducted towards the nozzle area 7 located radially inwards and on the other hand a mechanical stability of the web areas 17 is maintained.

Of course, in order to achieve the desired functionality, i. e. to direct the heating current in a rear area of the heating chamber 1 specifically radially inwards towards the nozzle area 7, a geometric design of the heating chamber 1 may also be carried out in another way. For example, the geometric design of the constricted section 13, a number of web areas 17 provided in the constricted section 13 and/or a geometric design of these web areas 17 and any recesses 19 formed therein may be varied.

Figure 7:
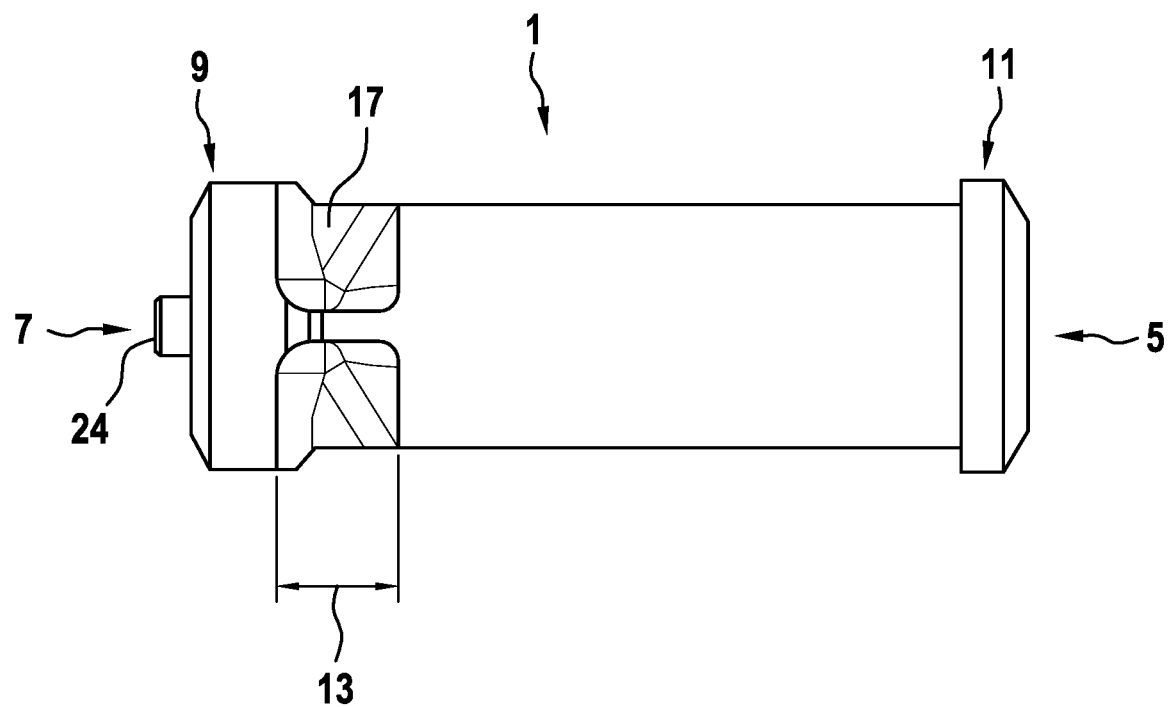
Figure 8:
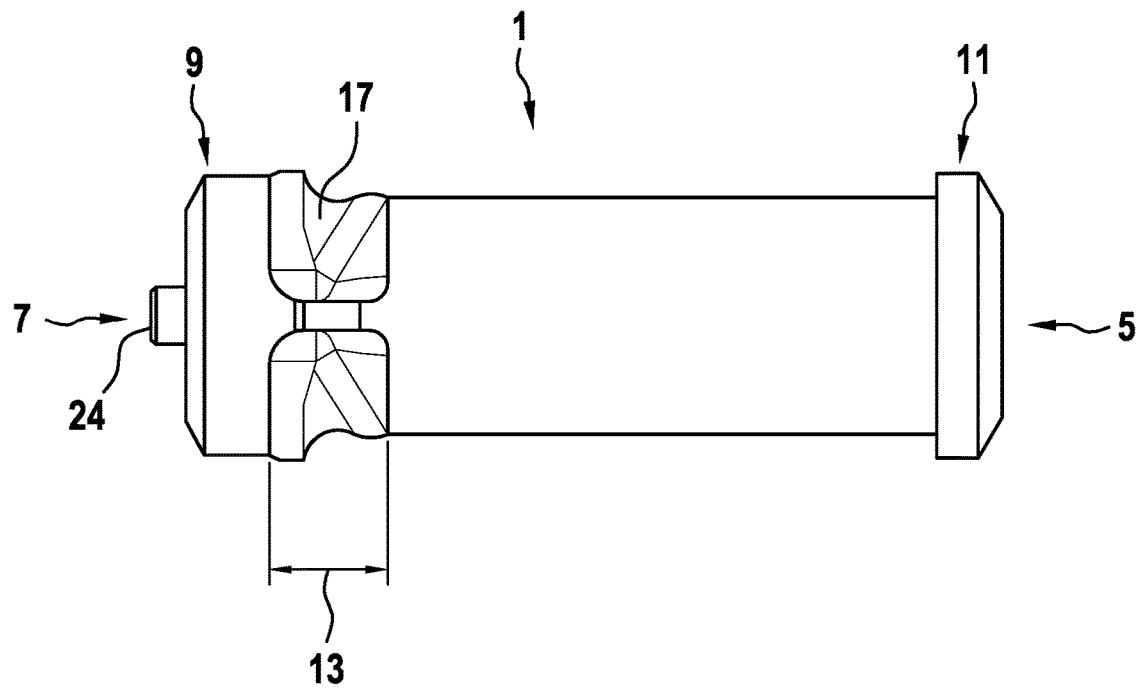
Figure 9:
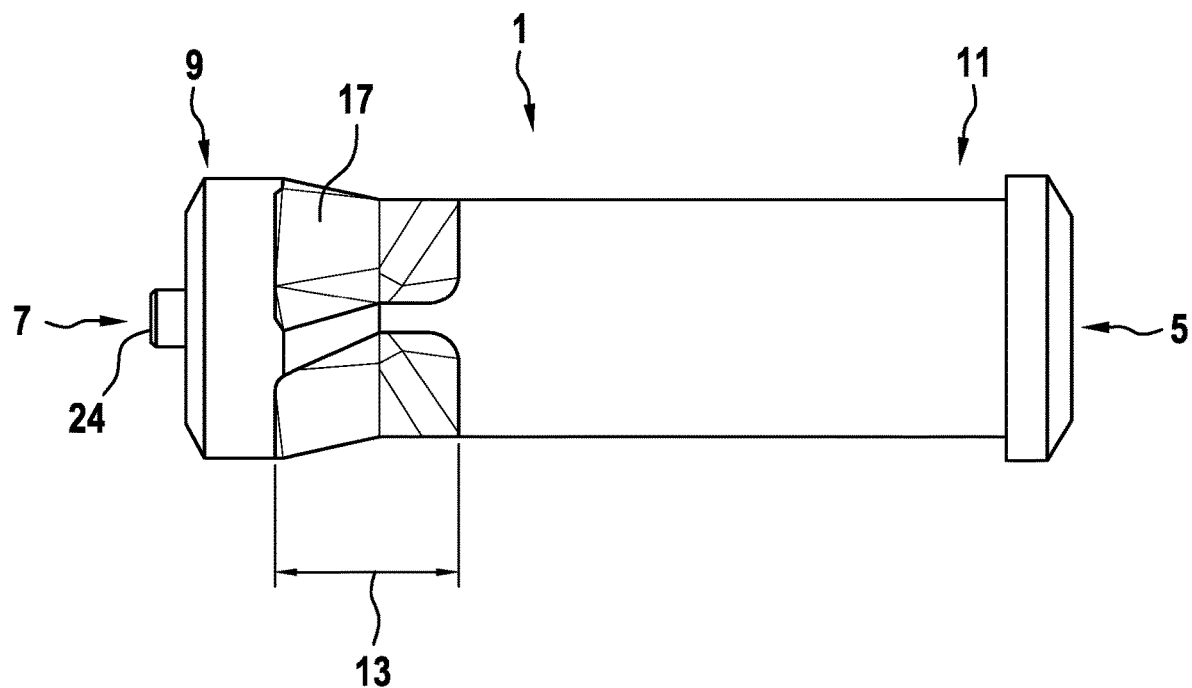

FIG. 7, for example, shows a heating chamber 1 with webs 17 in the form of simple ribs without recesses. FIG. 8 shows a heating chamber 1 with tapered webs 17 or additionally inserted constrictions where a web width increases or decreases towards the outside. FIG. 9 shows a heating chamber 1 with webs 17 arranged at an angle in the axial direction. Non-linear webs, e. g. in the form of arches, are also conceivable. In principle, a heating chamber 1 can be provided without any web areas, given that sufficient mechanical stability is ensured in another suitable way especially in the constricted section.

A heating furnace or analysis device fitted with the modified heating chamber 1 proposed herein may in principle have the same or analogous design as the conventional analysis device shown in FIG. 1.

Finally, it should be noted that terms such as "having", "comprising", etc. do not exclude any other elements or steps and terms such as "a" or "an" do not exclude a plurality. It should also be noted that features or steps described with reference to one of the above embodiments may also be used in combination with other features or steps of other embodiments described above. Reference signs in the claims are not to be regarded as a limitation.

LIST OF REFERENCE SIGNS 1 heating chamber
2 sample
3 wall
4 barrel inner surface
5 sample reception area
6 funnel-shaped intermediate area
7 nozzle area
8 longitudinal axis
9 first electrical connection area
10 rear end face
11 second electrical connection area
12 sample carrier
13 constricted section
14 front end face
15 non-constricted section
17 web area
19 recess
24 nozzle outlet
100 analysis device
101 heating chamber
102 sample
103 wall
104 heating furnace
105 sample reception area
106 connecting tube
107 nozzle area
108 spectrometer
109 first electrical connection area
110 nozzle
111 second electrical connection area
112 sample carrier
114 first electrical contact
116 second electrical contact
118 mechanical mount
120 current source
122 carrier gas
124 nozzle outlet
126 sheathing gas
128 aerosol

The invention claimed is:

1. A heating chamber for a heating furnace, comprising:
an electrically conductive wall;
a sample reception area;
a nozzle area;
a first electrical connection area; and
a second electrical connection area,
wherein the sample reception area and the nozzle area are each surrounded by the wall,
wherein the sample reception area and the nozzle are arranged one after the other along a central longitudinal axis and are configured in fluid communication with each other, and the sample reception area has a larger cross-sectional area than the nozzle area,
wherein the first and second electrical connection areas are arranged adjacent to opposite ends of the heating chamber relative to the longitudinal axis of the heating chamber and are electrically connected to the wall,
wherein the heating chamber is configured in such a way that an electric current produced by applying an electric voltage to the first and second electrical connection areas flows through the wall in such a way that a heating capacity caused by it is one of equal and higher in the nozzle area compared to the sample reception area,
wherein the first and second electrical connection areas are in a radial direction arranged further from the longitudinal axis than a part of the wall surrounding the nozzle area,
wherein the heating chamber is configured in such a way that the current produced between the first and second electrical connection areas is directed predominantly radially inwards towards the part of the wall surrounding the nozzle area, and
wherein the wall has a narrowed cross-section geometry in a constricted section in which the wall surrounds the nozzle area compared to areas of non-constricted sections in which the wall surrounds the sample reception area, such that, in the constricted section, a radially outward facing surface of the wall is on average less remote from the central longitudinal axis than in the non-constricted sections in which the wall surrounds the sample reception area, such that an electric current fed at the first electrical connection area must, in the constricted section, first of all flow towards the radially inner nozzle area and there flow through a small cross-section so that a high electric current density is reached locally and thus a high heating capacity is achieved.

2. The heating chamber according to claim 1, wherein the first and second electrical connection areas are formed by end faces of the wall at the opposite ends of the heating chamber, and wherein the first and second electrical connection areas have a substantially identical cross-section geometry.

3. The heating chamber according to claim 1, wherein at least one of the sample reception area and the nozzle area are configured axially symmetrical relative to the longitudinal axis.

4. The heating chamber according to claim 3, wherein at least one of the sample reception area and the nozzle area are configured rotationally symmetrical relative to the longitudinal axis.

5. The heating chamber according to claim 1, wherein the wall, adjacent to at least one of the sample reception area and the nozzle area, is configured axially symmetrical relative to the longitudinal axis.

6. The heating chamber according to claim 5, wherein the wall, adjacent to at least one of the sample reception area and the nozzle area, is configured rotationally symmetrical relative to the longitudinal axis.

7. The heating chamber according to claim 1, wherein the nozzle area with a nozzle outlet located radially far inside protrudes in an axial direction beyond end faces of the wall located radially further outside.

8. The heating chamber according to claim 1, wherein the wall is made of graphite.

9. The heating chamber according to claim 1, wherein the entire heating chamber is made of graphite.

10. The heating chamber according to claim 1, wherein the entire heating chamber is integrally formed.

11. A heating chamber for a heating furnace, comprising:
an electrically conductive wall;
a sample reception area;
a nozzle area;
a first electrical connection area; and
a second electrical connection area,
wherein the sample reception area and the nozzle area are each surrounded by the wall,
wherein the sample reception area and the nozzle are arranged one after the other along a central longitudinal axis and are configured in fluid communication with each other, and the sample reception area has a larger cross-sectional area than the nozzle area,
wherein the first and second electrical connection areas are arranged adjacent to opposite ends of the heating chamber relative to the longitudinal axis of the heating chamber and are electrically connected to the wall, and
wherein the heating chamber is configured in such a way that an electric current produced by applying an electric voltage to the first and second electrical connection areas flows through the wall in such a way that a heating capacity caused by it is one of equal and higher in the nozzle area compared to the sample reception area,
wherein the wall has a narrowed cross-section geometry in a constricted section in which the wall surrounds the nozzle area compared to areas in which the wall surrounds the sample reception area, and
wherein the heating chamber, in the constricted section, has web areas which bridge the constricted section in order to form a mechanically loadable linear connection between the opposite ends of the heating chamber.

12. A heating chamber for a heating furnace, comprising:
an electrically conductive wall;
a sample reception area;
a nozzle area;
a first electrical connection area; and
a second electrical connection area,
wherein the sample reception area and the nozzle area are each surrounded by the wall,
wherein the sample reception area and the nozzle are arranged one after the other along a central longitudinal axis and are configured in fluid communication with each other, and the sample reception area has a larger cross-sectional area than the nozzle area,
wherein the first and second electrical connection areas are arranged adjacent to opposite ends of the heating chamber relative to the longitudinal axis of the heating chamber and are electrically connected to the wall, and
wherein the heating chamber is configured in such a way that an electric current produced by applying an electric voltage to the first and second electrical connection areas flows through the wall in such a way that a heating capacity caused by it is one of equal and higher in the nozzle area compared to the sample reception area,
wherein the wall has a narrowed cross-section geometry in a constricted section in which the wall surrounds the nozzle area compared to areas in which the wall surrounds the sample reception area, and
wherein the heating chamber has a plurality of web regions distributed equidistantly along a circumference of the constricted section.

13. A heating furnace, comprising:
a mechanical mount;
first and second electrical contacts; and
a heating chamber according to claim 1,
wherein the heating chamber is held in the mount and the first electrical connection area is contacted with the first electrical contact and the second electrical connection area is contacted with the second electrical contact.

14. An analysis device for analyzing foreign matter contents in samples, comprising:
a heating furnace according to claim 13;
a connecting tube; and
a spectrometer,
wherein the nozzle area of the heating chamber of the heating furnace opens into the connecting tube in such a way and the connecting tube opens into the spectrometer in such a way that gas formed in the sample reception area of the heating chamber may be conducted into the spectrometer via the nozzle area and the connecting tube.

15. A method of analyzing foreign matter contents in samples, wherein the samples are heated in a sample reception area of a heating chamber according to claim 1 in order to release foreign matter contents contained therein.

* * * * *